United States Patent [19]
Anderson et al.

[11] 3,900,380
[45] Aug. 19, 1975

[54] PREPARATION OF FLUORINATED CYCLOBUTENYL ALKYL ETHER COPOLYMERS

[75] Inventors: Richard W. Anderson, Englewood, Colo.; Hughie R. Frick, Midland, Mich.

[73] Assignee: The Dow Chemical Company, Midland, Mich.

[22] Filed: Mar. 21, 1974

[21] Appl. No.: 453,652

Related U.S. Application Data

[62] Division of Ser. No. 231,404, March 2, 1972, Pat. No. 3,840,603.

[52] U.S. Cl. ............................................. 204/163 R
[51] Int. Cl. ................................................. B01j 1/10
[58] Field of Search .................................. 204/163 R

[56] References Cited
UNITED STATES PATENTS 3,228,864   1/1966   Mastrangelo.................... 204/163 R

*Primary Examiner*—Leland A. Sebastian
*Attorney, Agent, or Firm*—Edward E. Schilling

[57] ABSTRACT

Disclosed are highly fluorinated polymers of the formula:

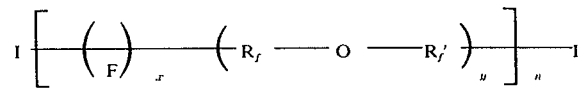

In the above formula, $R_f$ and $R_f'$ are straight or branched chain perfluoroalkyl groups or perfluoroalkyl ethers having a combined number of carbon atoms totaling from 3 to 20, $n$ is a number of from 2 to 10,000 representing the degree of polymerization and the ratio of x:y ranges from 0.001:1 to 1000:1. The polymers are thermally stable and flexible. In addition they contain double bonds as crosslinking sites.

3 Claims, No Drawings

PREPARATION OF FLUORINATED CYCLOBUTENYL ALKYL ETHER COPOLYMERS

CROSS-REFERENCE TO RELATED APPLICATION

This is a division of application Ser. No. 231,404 filed Mar. 2, 1972, now U.S. Pat. No. 3,840,603.

BACKGROUND OF THE INVENTION

Perfluorinated cyclobutadiene polymers have been made. We report their preparation in co-pending application Ser. No. 869,338 filed Oct. 24, 1969, now U.S. Pat. No. 3,682,876. These polymers have good thermal stability, but at high molecular weights they are inflexible. Likewise, polymers of perfluorinated ethers are reported in U.S. Pat. No. 3,505,411. These polyethers are flexible, but because of their high chemical stability are difficult to crosslink by normal chemical methods. This invention combines the two systems in such a way that flexible polymers result containing double bonds which can act as crosslinking sites.

SUMMARY OF THE INVENTION

The present invention comprises highly fluorinated polymers of the formula:

and a method for their preparation. In the above formula, $R_f$ and $R_f'$ are straight or branched chain perfluoroalkyl or perfluoroalkyl ethers having a combined number of carbon atoms of from 3 to 20, n is a number of from 2 to 10,000 representing the degree of polymerization and the ratio of x:y ranges from 0.001:1 to 1000:1.

DETAILED DESCRIPTION

The polymers are prepared by a coupling type polymerization in which mercury and ultraviolet light are employed as reaction promoters. The reaction time may range from 1 hour to 6 months or more depending on the degree of polymerization desired. The reaction temperature may vary from −30°C. to 250°C. with a temperature of from 20° to 150°C. being preferred.

The monomeric materials are iodine terminated in order for the coupling reaction to proceed. The general reaction is set out in equation I.

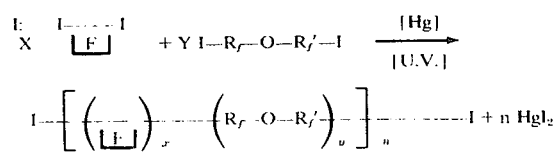

In the above formula, $R_f$ and $R_f'$ are perfluoroalkyl groups or perfluoroalkyl ethers selected so that the total number of carbon atoms in the $I-R_f-O-R_f'-I$ group ranges from 3 to 20. Specific examples of $R_f$ and $R_f'$ are perfluorinated methyl, propyl, pentyl, isooctyl, decyl, dodecyl, tetradecyl and hexadecyl. The $R_f$ and $R_f'$ groups may independently be perfluoroalkyl ethers examples of which are perfluorinated ethyl propyl ether, propyl pentyl ether, and ethyl pentyl ether.

The preferred polymers of the instant invention are those in which n is a number from 2 to 1,000, the combined number of carbon atoms in $R_f$ and $R_f'$ is from 3 to 11 and the ratio of x:y ranges from 1:5 to 5:1. When a liquid or rubbery polymer is desired, the 1:5 ratio is selected.

The iodine terminated perfluoro cyclobutene is prepared as set out in co-pending application 869,338. The iodine terminated ether may be prepared by the process disclosed in U.S. Pat. No. 3,505,411. Iodine terminated polyethers are also prepared by reacting a difunctional perfluoroacetyl fluoride with tetrafluoro ethylene in the presence of potassium fluoride and iodine. This preparation is indicated by equations II and III:

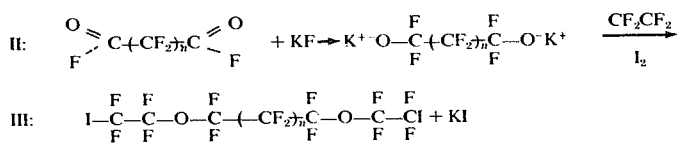

In the above reaction n is a number from 1 to 14 thus providing a diether having up to 20 carbon atoms.

A method for preparing iodine terminated monoethers is represented by equations IV and V:

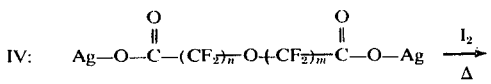

V: $I(CF_2)_n O -CF_2)_m I + 2AgI + 2CO_2$

In the above equation, $m + n$ is equal to from 3 to 20.

The invention is further illustrated by the following examples.

EXAMPLES 1–5

In each of the following examples, polymers were prepared by reacting perfluoro 3,4-diiodocyclobutene with perfluoro-1,11-diiodo-3,9-dioxaundecane to form a polymer of the formula:

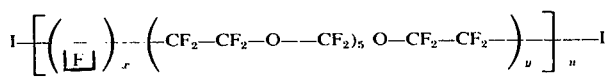

The reaction was carried out in a glass pressure vessel containing excess elemental mercury. In each run $CCl_2FCClF_2$ was employed as solvent. The reaction mass was irradiated with ultraviolet light while being cooled to 30° to 40°C. with a stream of air. After the reaction had gone to completion, as indicated by the presence of black mercuric iodide, the reaction mixture was centrifuged, with the freon soluble portion of the polymer being decanted off, leaving the mercuric iodide and insoluble portion of the polymer behind. Then the soluble portion of the polymer was washed with aqueous potassium iodide. The solvent was evaporated to recover the polymer and the insoluble portion purified by vacuum subliming the mercury and mercury iodides from the polymer.

The ratio of perfluorobutene moieties to perfluoroether moieties in the polymer are modified by adjusting the stoichiometry. The degree of polymerization in each run was determined by iodine end group analysis.

The reactants and products of examples 1–5 are set out in Table I.

Due to their high fluorine content these compounds exhibit good thermal and oxidation resistance. The liquid polymers are useful as hydraulic fluids for high temperature applications such as breaking systems. The solid polymers can be used to form ablatives and gaskets for uses in which stability is essential.

20, $n$ is a number from 2 to 10,000 representing the degree of polymerization and the ratio of x:y ranges from 0.001:1 to 1000:1, which comprises reacting in the presence of mercury and ultraviolet light a diiodo perfluorocyclobutene of the formula

with an iodo terminated perfluoroalkyl ether of the formula I—$R_f$—O—$R_f'$—I wherein $R_f$ and $R_f'$ are straight or branched chain perfluoroalkyl groups or perfluoroalkyl ethers having a combined number of carbon

TABLE I

| | REACTION PARAMETERS | | | | | PRODUCT PARAMETERS | |
|---|---|---|---|---|---|---|---|
| Cyclobutene (X) | Ether (Y) | Ratio X:Y | Mercury gm. | Solvent | Time, Hour | Degree of Polymerization | Physical Properties |
| 1. 11.6 gm. (0.034 mole) | 5.0 gm. (0.0068 Mole) | 5:1 | 10.0 | 50 ml. | 309 | n = ~ 35 | Soft Solid |
| 2. 0.412 gm. (0.00109 mole) | 4.0 gm. (0.0054 Mole) | 1:5 | 10.0 | 25 ml. | 76 | n = ~ 350 | Mobile non-volatile liquid |
| 3. 1.285 gm. (0.0034 mole) | 5.0 gm. (0.0068 Mole) | 1:2 | 10.0 | 25 ml. | 112 | n = ~ 300 | Mobile non-volatile liquid |
| 4. 2.57 gm. (0.0068 mole) | 5.0 gm. (0.0068 Mole) | 1:1 | 10.1 | 25 ml. | 196 | n = ~ 300 | Mobile non-volatile liquid |
| 5. 5.14 (0.0136 mole) | 5.0 gm. (0.0068 Mole) | 2:1 | 10.2 | 25 ml. | 177 | n = ~ 160 | Mobile non-volatile liquid |

We claim:

1. A process for the preparation of a highly fluorinated polymer of the formula:

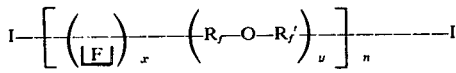

wherein $R_f$ and $R_f'$ are straight or branched chain perfluoroalkyl groups or perfluoroalkyl ethers having a combined number of carbon atoms totaling from 3 to 20, said process being further defined in that the ratio of perfluorocyclobutene to iodo terminated perfluoroalkyl ether may range from 1000:1 to 1:1000.

2. The process of claim 1 wherein the temperature is maintained at a level from −30° to 250°C.

3. The process of claim 1 wherein the perfluorocyclobutene and iodo terminated perfluoroalkyl ether are reacted in a solvent capable of disolving the reactants and the resulting product.

* * * * *

UNITED STATES PATENT OFFICE
CERTIFICATE OF CORRECTION

PATENT NO. : 3,900,380
DATED : August 19, 1975
INVENTOR(S) : Richard W. Anderson and Hughie R. Frick It is certified that error appears in the above-identified patent and that said Letters Patent are hereby corrected as shown below:

On page 1, under Abstract, correct the formula as follows:

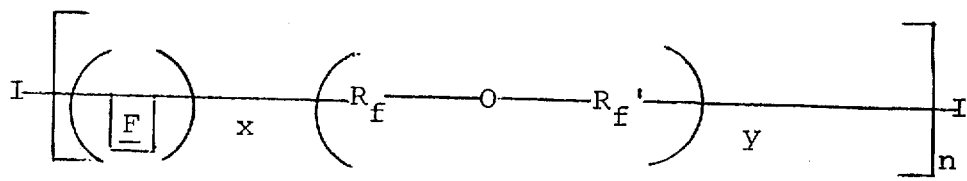

Column 1, line 35, in the formula under Summary of the Invention, underline the F as in the above formula.

Column 1, line 65, correct the formula as follows:

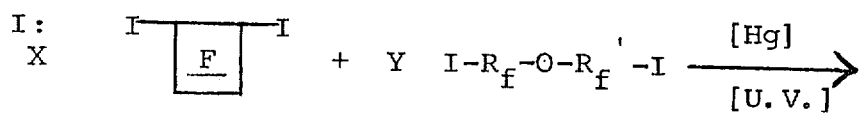

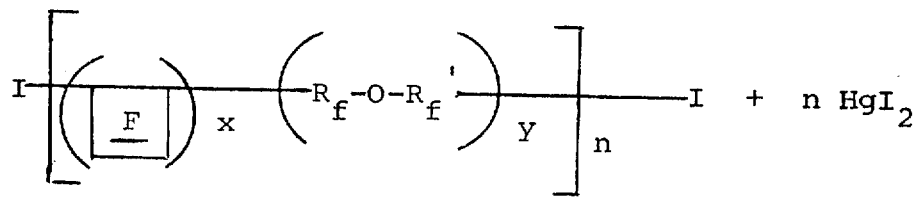

UNITED STATES PATENT OFFICE
CERTIFICATE OF CORRECTION

PATENT NO. : 3,900,380  Page 2
DATED : August 19, 1975
INVENTOR(S) : Richard W. Anderson and Hughie R. Frick It is certified that error appears in the above-identified patent and that said Letters Patent are hereby corrected as shown below:

In Column 2, correct line 43 as follows:

V:  $I(CF_2)_n\text{-}O\text{-}(CF_2)_m I + 2AgI + 2CO_2$

In column 2, under Examples 1-5, correct the formula as follows:

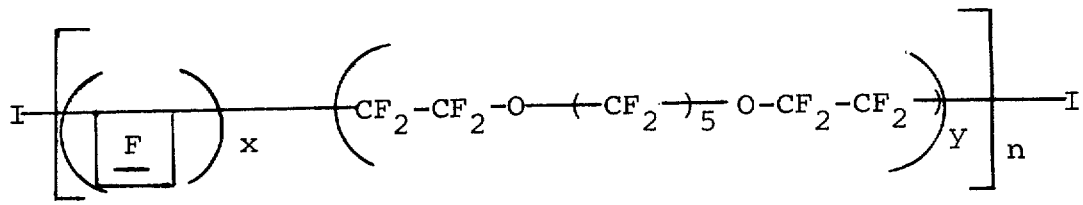

In column 3, under Claim 1, underline the $\underline{F}$ in the formula, as in the above formula, as follows:

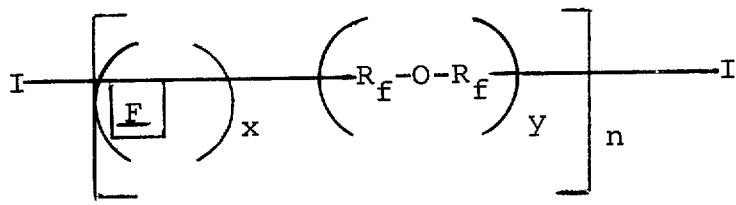

UNITED STATES PATENT OFFICE
CERTIFICATE OF CORRECTION

PATENT NO. : 3,900,380                        Page 3
DATED       : August 19, 1975
INVENTOR(S) : Richard W. Anderson and Hughie R. Frick It is certified that error appears in the above-identified patent and that said Letters Patent are hereby corrected as shown below:

In column 4, correct the formula in Claim 1 as follows:

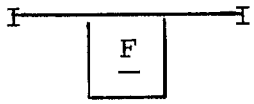

Signed and Sealed this ninth Day of December 1975

[SEAL]

Attest:

RUTH C. MASON
*Attesting Officer*

C. MARSHALL DANN
*Commissioner of Patents and Trademarks*